United States Patent
Inoue et al.

(10) Patent No.: US 7,441,400 B2
(45) Date of Patent: Oct. 28, 2008

(54) EXHAUST SYSTEM FOR AN INTERNAL COMBUSTION ENGINE

(75) Inventors: Takao Inoue, Kanagawa (JP); Kouichi Mori, Kanagawa (JP); Sunki I, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 72 days.

(21) Appl. No.: 11/399,997

(22) Filed: Apr. 7, 2006

(65) Prior Publication Data

US 2006/0225408 A1  Oct. 12, 2006

(30) Foreign Application Priority Data

Apr. 8, 2005  (JP) .............................. 2005-111477

(51) Int. Cl.
*F02M 25/06* (2006.01)

(52) U.S. Cl. .............................. 60/278; 60/274; 60/287

(58) Field of Classification Search ............... 60/274, 60/278, 287, 288, 299
See application file for complete search history.

(56) References Cited

U.S. PATENT DOCUMENTS

| 3,712,281 | A | * | 1/1973 | Ruth ........................ 123/25 P |
| 5,205,265 | A | * | 4/1993 | Kashiyama et al. .... 123/568.12 |
| 7,104,048 | B2 | * | 9/2006 | Brown ......................... 60/286 |

| 2003/0213230 | A1 | * | 11/2003 | Yahata et al. ................ 60/278 |

FOREIGN PATENT DOCUMENTS

| EP | 1 188 909 A2 | 3/2002 |
| EP | 1 420 150 A1 | 5/2004 |
| EP | 1 605 145 A1 | 12/2005 |
| GB | 2 280 711 A | 2/1995 |
| JP | 05-321644 | 12/1993 |
| JP | 05321644 | 12/1993 |
| JP | 07-077034 | 3/1995 |
| JP | 11-280565 | * 10/1999 |
| JP | 2005-351088 | 12/2005 |

OTHER PUBLICATIONS

English Abstract of JP07-077034.
English Abstract of JP05-321644.
English Abstract for JP2005351088.
European Search Report No. 06251982.2-2311 dated Aug. 11, 2006.

* cited by examiner

*Primary Examiner*—Thomas Denion
*Assistant Examiner*—Diem Tran
(74) *Attorney, Agent, or Firm*—Global IP Counselors, LLP

(57) ABSTRACT

An exhaust system for an internal combustion engine is disclosed. The exhaust system includes at least one main exhaust path connected to at least one cylinder, an exhaust recirculation path that is branched out from the main exhaust path so that part of exhaust gas is recirculated to an inlet system, a bypass that is branched out from the exhaust recirculation path in which the bypass has a higher path resistance than that of the exhaust recirculation path and a bypass catalytic converter that is provided in the bypass.

15 Claims, 3 Drawing Sheets

EXHAUST SYSTEM FOR AN INTERNAL COMBUSTION ENGINE

RELATED APPLICATION

The disclosure of Japanese Patent Application No. 2005-111477, filed Apr. 8, 2005, including the specification, claims and drawings, is incorporated herein by reference in its entirety.

FIELD

The present exhaust system of an internal combustion engine has an exhaust recirculation system, and in particular has a bypass that branches out from a main exhaust path(s), and a bypass catalytic converter.

BACKGROUND

It is known to have an internal combustion engine with an exhaust system having a structure in which a main catalytic converter is located on the downstream side of the exhaust system provided, for example, under the floor of a vehicle. However, when the internal combustion engine is started under cold conditions, the exhaust purification effect of the catalytic converter is minimized until it is fully activated upon reaching an appropriated raised temperature. In contrast, when the catalytic converter is arranged on the upstream side of the exhaust system, namely closer to the internal combustion engine, durability of the catalyst within the catalytic convert is reduced due to the thermal deterioration.

In view of the above problem, as disclosed in Japanese Laid Open Patent No. H05-321644, an exhaust system has been proposed in which a bypass is provided in parallel to the upstream side portion of a main exhaust path with a main catalytic converter, and another catalytic converter is provided in the bypass. In such a system, exhaust gas is guided to the bypass by a switching valve, immediately after the engine is started in cold condition. With this structure, the bypass catalytic converter is relatively located on the upstream side of the main catalytic converter in the exhaust system, and exhaust purification can be started at an earlier stage because the activation is carried out at a relatively early stage.

SUMMARY

The present exhaust system for an internal combustion engine comprises at least one main exhaust path connected to at least one cylinder of the engine, an exhaust recirculation path that is branched out from the main exhaust path so that part of exhaust gas is recirculated to an inlet system, a bypass that is branched out from the exhaust recirculation path in which the bypass has a cross sectional path area smaller than that of the exhaust recirculation path, and a bypass catalytic converter that is provided in the bypass.

BRIEF DESCRIPTION OF THE DRAWINGS

Other features and advantages for the present exhaust system of an internal combustion engine will be apparent from the ensuing description, taken in conjunction with the accompanying drawings, in which.

DETAILED DESCRIPTION OF THE ILLUSTRATED EMBODIMENTS

Figure 1:
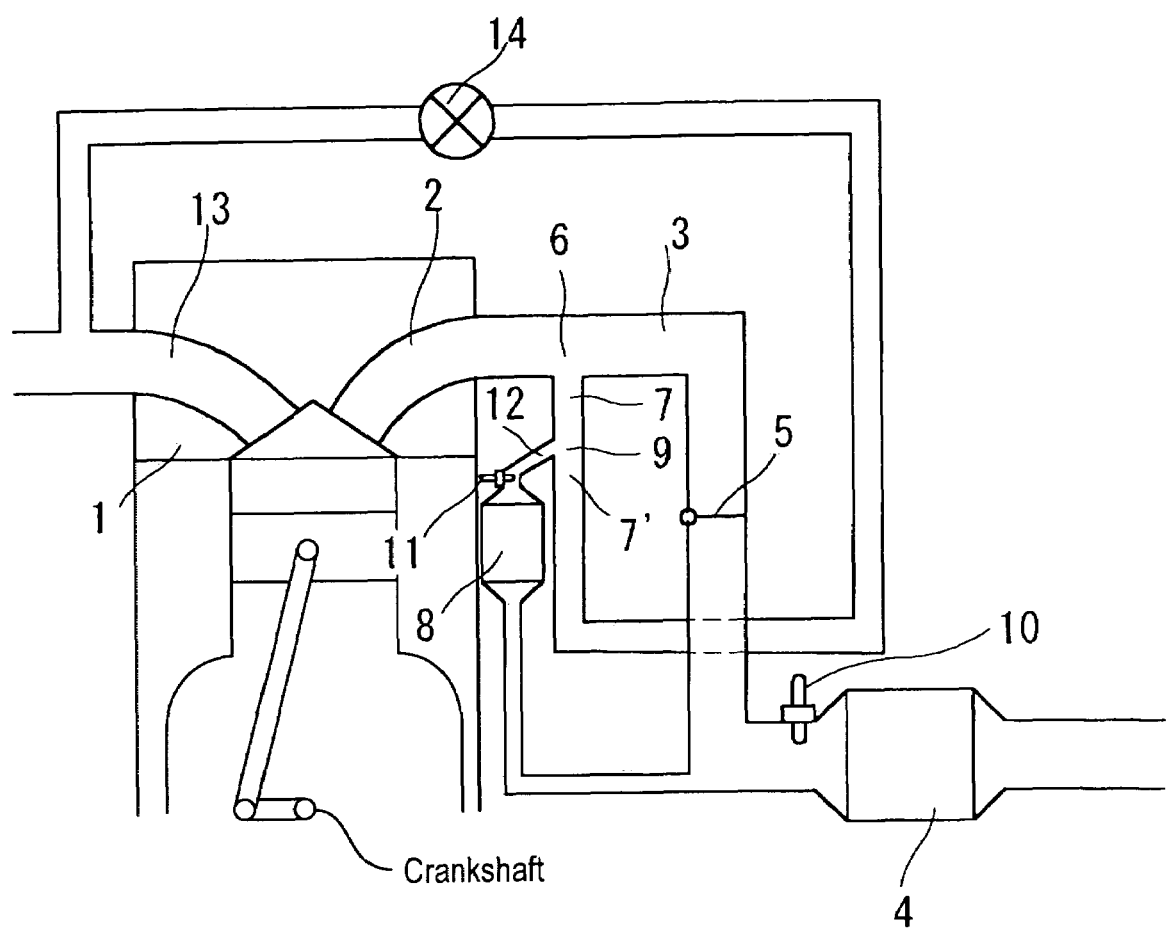
FIG. 1 is a schematic explanatory drawing showing an embodiment of an entire exhaust system.

While the claims are not limited to the illustrated embodiments, an appreciation of various aspects of the present exhaust system for an internal combustion engine is best gained through a discussion of various examples thereof.

An embodiment of an exhaust system for a serial 4-cylinder internal combustion engine will be described below in detail, referring to the drawings.

FIG. 1 shows a schematic pipe layout of the entire exhaust system, wherein among four exhaust ports 2, only one of them is shown.

The exhaust ports 2 for the four cylinders are in series provided on a cylinder head 1 so as to open to a side face thereof, and main exhaust paths 3 are connected to the exhaust ports 2, respectively. The four main exhaust paths 3 for the four cylinders (#1 to # 4) are joined to a single flow path by way of a joining point, and a main catalytic converter 4 having a large capacity is installed in a main catalytic path on the downstream side of the joining point of the main exhaust paths 3. In one illustrative embodiment, the main catalytic converter 4 is arranged under a floor of the vehicle, and, for example, contains a three-way catalyst and an HC trap catalyst as a catalyst. The main exhaust paths 3 and main catalytic converter 4 form a main flow path where exhaust gas flows during a normal operation. In addition, a flow path switching valve 5 that simultaneously opens/closes the main exhaust paths 3 (the single flow path), is provided on the downstream side of the joining point of four main exhaust paths 3 so as to serve as a flow path switching mechanism or means.

Since the main exhaust paths 3 that are provided for the respective separate cylinders are blocked by the flow path switching valve 5, even if an exhaust pulse is generated, the exhaust gas does not enter any of the main exhaust paths 3. Therefore, the exhaust gas does not flow through the main exhaust paths 3 in the downstream side of branching point 6, whereby it is possible to suppress heat from the exhaust gas so as not to be transmitted to the pipe members of the main exhaust paths 3.

As an exhaust recirculation system, an exhaust recirculation path 7 having a cross-sectional area smaller than that of the main exhaust paths 3 branches out from the respective main exhaust paths 3 for each of the cylinders. The branching points 6 that are located at the upstream end of respective four exhaust recirculation paths 7 are arranged as far upstream as possible on the main exhaust paths 3. The four exhaust recirculation paths 7 eventually join into a single flow path prior to reaching a branching point 9. Immediately downstream (i.e., after) of the joining point of the four recirculation paths 7 at branching point 9, however, a bypass 12 branches out. In other words, the exhaust recirculation paths 7 are joined into the single flow path prior to reaching branching point 9, and then the single flow path branches out to two paths at the branching point 9, that is, a downstream exhaust recirculation path 7' and the bypass 12. The other end of the downstream exhaust recirculation path 7' is connected to an inlet system, for example, upstream of an inlet port 13 of the cylinder head 1. An exhaust recirculation control valve 14 is provided in the middle of the downstream exhaust reflex path 7'. The downstream exhaust recirculation path 7' is controlled so as to be opened/closed by the exhaust recirculation control valve 14. Alternatively, the opening rate may be controlled continuously by valve 14.

The bypass 12 has a cross-sectional path area that is smaller than that of the downstream exhaust recirculation path 7'. A bypass catalytic converter 8 in which a three-way catalyst is contained is provided immediately after the bypass 12 branches out from the exhaust recirculation path 7 at branching point 9. The bypass catalytic converter 8 is compact and has a capacity less than that of the main catalytic converter 4. It preferably includes a catalyst having superior activity at low temperatures. The downstream end portion of the bypass 12 that extends from the exit of the bypass catalytic converter 8 is connected to the upstream side of the main catalytic converter 4 provided in the single flow path.

Air-fuel ratio sensors 10 and 11 are provided at respective entrance portions of the main catalytic converter 4 and the bypass catalytic converter 8.

With such a structure, when the temperature of the engine or its exhaust gas is low immediately after a cold start, the flow path switching valve 5 is closed by an appropriate actuator, so that the main flow path is closed. Therefore, the entire volume of the exhaust gas that is discharged from the cylinders flows into the respective exhaust recirculation paths 7 via the respective branching points 6, thereby flowing through the bypass 12 and the bypass catalytic converter 8 (in case that the exhaust recirculation control valve 14 is closed). The bypass catalytic converter 8 is compact and located on the upstream side of the exhaust system, namely closer to the exhaust ports 2, compared with the main catalytic converter 4, so that it is immediately activated and starts exhaust purification at an early stage after engine activation and before normal operating temperatures are reached. After the exhaust gas passes through the bypass catalytic converter 8 it then passes through the main catalytic converter 4 downstream of the bypass catalytic converter 8, receiving at least a small amount of additional purification effect. At the same time, the temperature of the main catalytic converter 4 is increased. When the exhaust recirculation control valve 14 opens, part of exhaust gas recirculates to the inlet system via the downstream exhaust recirculation path 7'. However, in general, an exhaust recirculation is often not carried out during a cold stage because it causes unstable combustion.

On the other hand, when the engine is getting warm up and the temperature of the engine or the exhaust gas becomes sufficiently high, the flow path switching valve 5 is opened so that the exhaust gas that is discharged from each cylinder passes mainly through from the main exhaust paths 3 to the main catalytic converter 4 by way of the main flow path. Under such operational conditions the bypass 12 is not particularly blocked because it has a higher path resistance than the main flow path. The bypass 12 has a cross-sectional area which is smaller than that of the main flow path. Moreover, the bypass catalytic converter 8 provided in the bypass 12 adds additional resistance. As a result, most of the exhaust gas flows through the main flow path. That is, the exhaust gas hardly flows through the bypass 12. Thus, the thermal deterioration or pollution of the bypass catalytic converter 8 is sufficiently suppressed or securely avoided.

In addition, after the engine is warmed up, the exhaust recirculation is carried out in most of an engine operational period, except for a high speed load period etc. In the exhaust recirculation period in which the exhaust recirculation control valve 14 opens as described above, the exhaust gas recirculates to the inlet system via the exhaust recirculation path 7 in the upstream side and the downstream exhaust recirculation path 7'. Since the pressure of the inlet system is far lower than that in the downstream side of the bypass catalytic converter 8 with the bypass 12, the quantity of exhaust gas that passes through the bypass catalytic converter 8 is much lower than that of the exhaust recirculation path 7'. Consequently, once again the thermal deterioration or pollution of the bypass catalytic converter 8 over time is sufficiently suppressed or securely avoided. The exhaust recirculation control valve 14 also opens while a supplied fuel is reduced due to a speed reduction so that the exhaust gas is recirculated.

Figure 2:
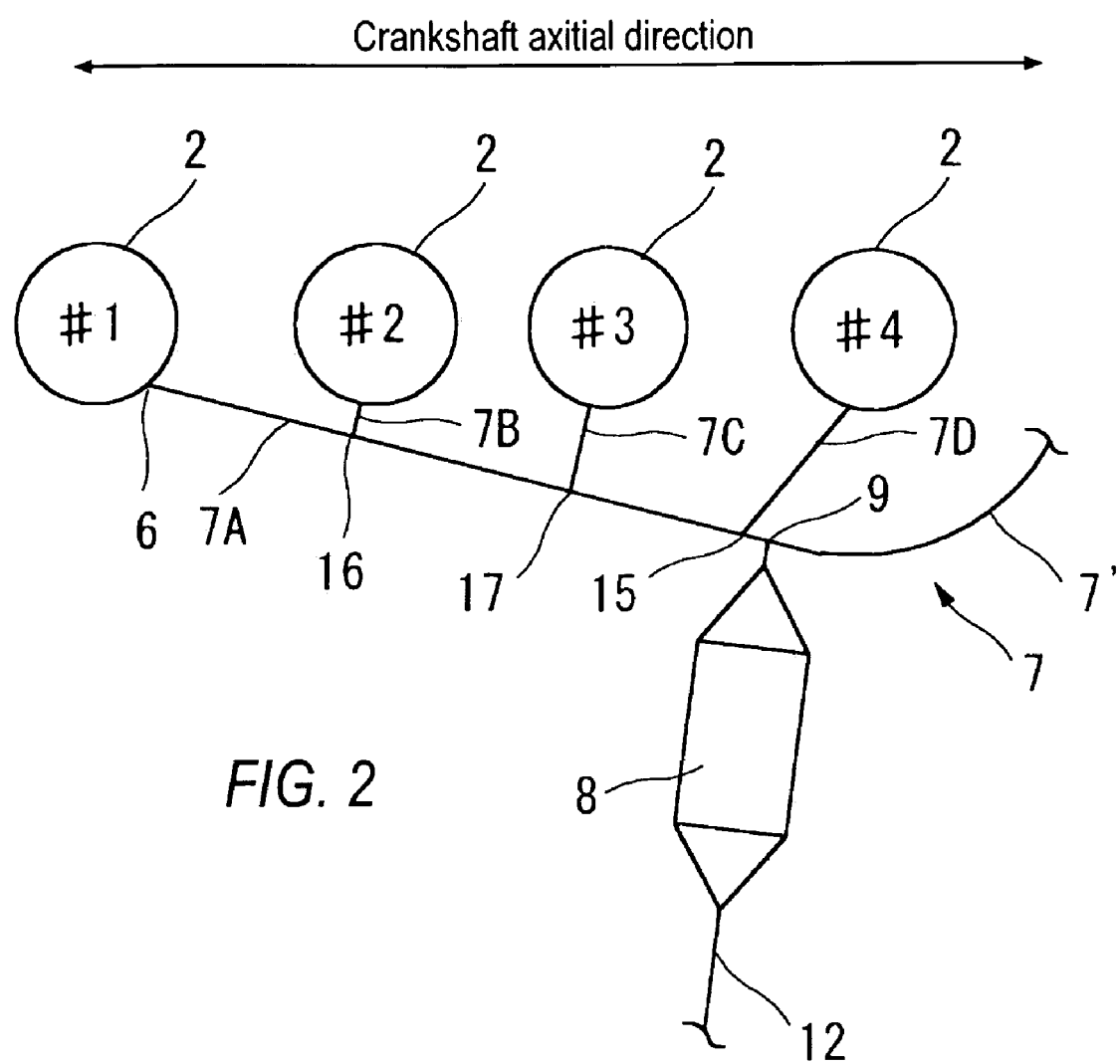
FIG. 2 is a explanatory drawing showing a piping layout of an exhaust recirculation path.

A piping layout in which the four exhaust recirculation paths 7 are joined into a single flow path is described, referring to FIG. 2.

FIG. 2 is a schematic view of a piping layout of the exhaust recirculation paths 7. The exhaust recirculation paths 7 for the cylinders #1, #2, #3, and #4 are shown as numerals 7A, 7B, 7C, and 7D, respectively. In FIG. 2, the cylinder head 1 of FIG. 1 is viewed from the engine side, wherein the positions of the exhaust ports 2 for the respective cylinders are not virtually different from those of the main exhaust paths 3. As shown in FIG. 2, in the present embodiment, the exhaust recirculation path 7A for the cylinder #1 that is located at one end of the internal combustion engine extends straight diagonally downward to a joining point 15 close to the cylinder #4 that is immediately before the branching point 9. In one embodiment joining point 15 is closely adjacent branching point 9 if not abutting. In another embodiment the joining point 15 is also the branching point 19. The exhaust recirculation path 7D for the cylinder #4, which is located at the other end extends straight so as to diagonally cross the exhaust recirculation path 7A for the cylinder #1. The exhaust reflex paths 7A and 7D are joined to each other at a joining point 15. In addition, the exhaust recirculation path 7B for the cylinder #2 and the exhaust recirculation path 7C for the cylinder 3# extend straight in the direction orthogonal to the exhaust recirculation path 7A for the cylinder #1, each of which is perpendicularly connected to the exhaust recirculation path 7A for the cylinder #1 at the joined portions or joining points 16 and 17, respectively. Furthermore, a path on the downstream side of the joining point 15 smoothly extends from the joining point 15 along the exhaust recirculation path 7A for the cylinder #1 so as to be extended approximately straight. The downstream exhaust recirculation path 7' approximately extends straight to the branching point 9, from which the bypass 12 branches at an appropriate angle.

Therefore, according to the present embodiment, the exhaust reflex path 7 becomes a single path from the joining point 15 which is located below and in-between the cylinders #1 and #4 but closer to the cylinder #4. The exhausts recirculation paths 7B to 7D for the cylinders #2 to #4 are connected, with the shortest distance, to the exhaust recirculation path 7A, which also connects with the shortest distance between the branching point 6 of the cylinder #1 and the joining point 15. Consequently, the total length of the exhaust recirculation paths 7 for the respective cylinders #1 to #4 to the joining point 15 becomes the shortest. In addition, since the recirculation exhaust gas smoothly flows towards the inlet system, the exhaust gas does not easily enter the bypass 12.

Figure 3:
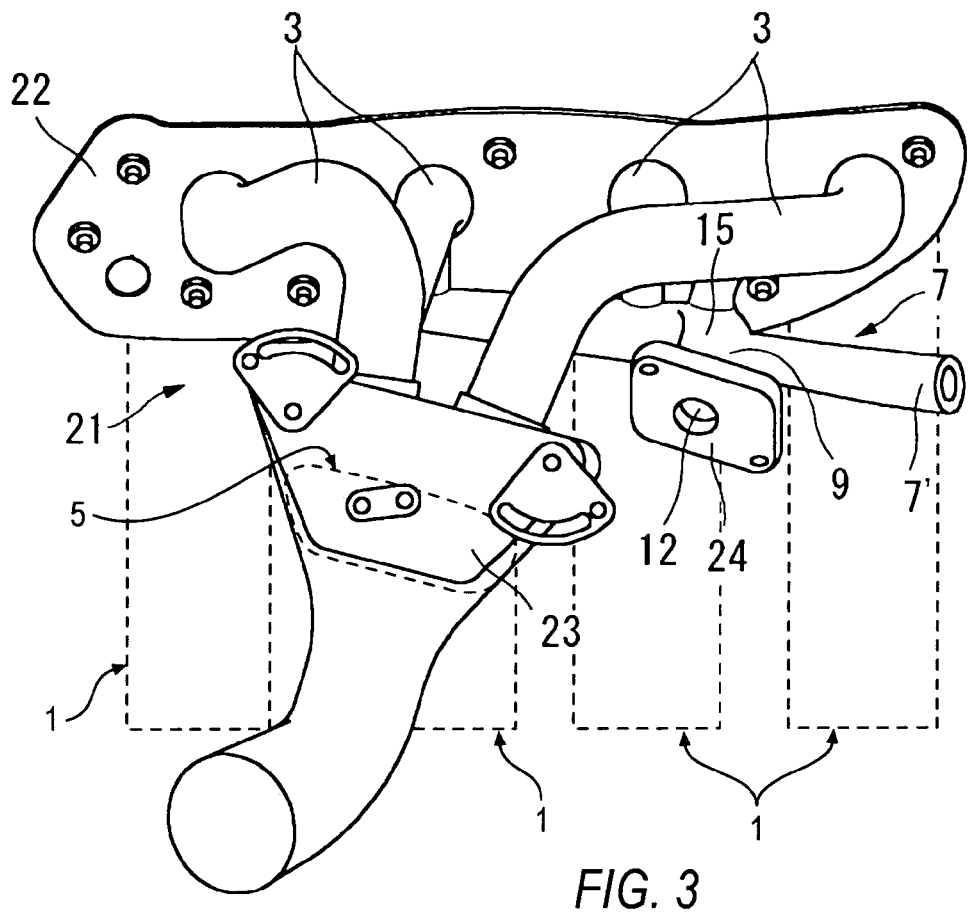
FIG. 3 is a side view showing the more detailed structure of main exhaust paths and an exhaust recirculation path.
Figure 4:
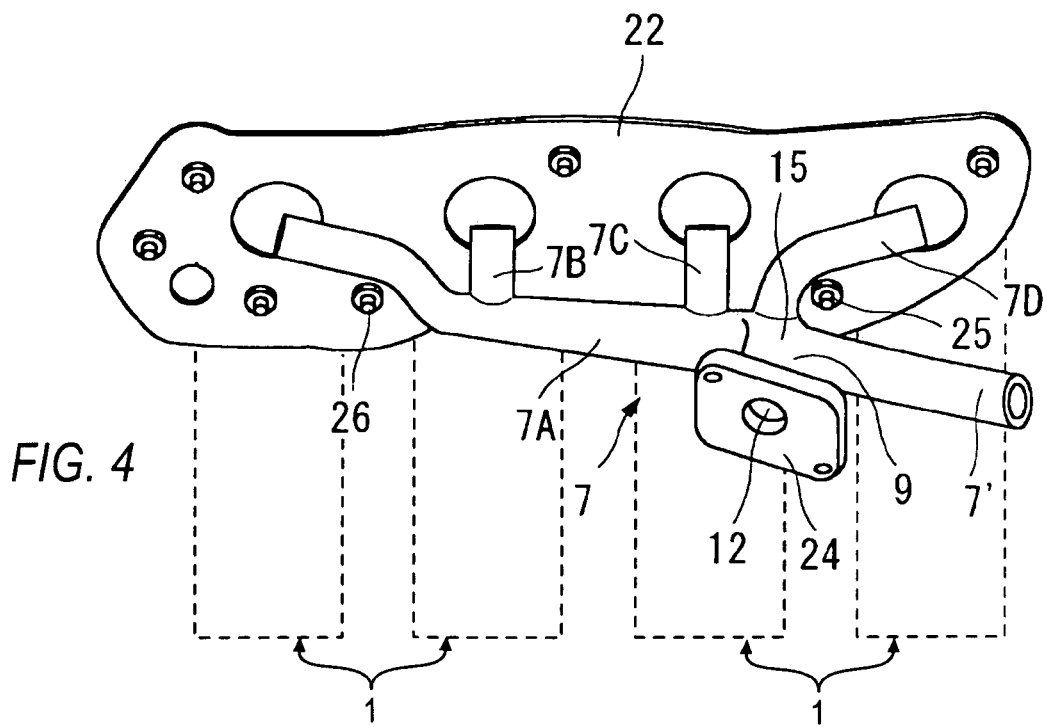
FIG. 4 is a side view in which main exhaust paths are no longer present to facilitate illustration of the exhaust recirculation path.

Next, in FIGS. 3 and 4 a more detailed structure of the main exhaust paths 3 and exhaust recirculation paths 7 is shown. The four main exhaust paths 3 are integrated as an exhaust manifold 21 having an attachment flange 22 for attaching the paths 3 for each cylinder to the cylinder head 1, each of which curves downwards and are joined into the single flow path via a valve unit 23 having the built-in flow path switching valve 5 that is described above. The valve unit 23, which is the joining point of the four main exhaust paths 3, is arranged at a position closer to the front side of the internal combustion engine in the front to back direction of the internal combustion engine. The exhaust recirculation paths 7 are arranged in the space below the main exhaust paths 3 that is curved downwards, and their joining point 15 is located closer to the back side of the internal combustion engine, so that the bypass catalytic converter 8 that is attached to the bypass catalytic converter attachment flange 24 immediately after the joining point 15 does not overlap with the valve unit 23 on the side of the main exhaust paths 3 in the front to back direction.

FIG. 4 is a side view in which the main exhaust paths 3 of FIG. 3 are removed. As described above, the exhaust recirculation path 7A for the cylinder #1 that is located at one end, extends diagonally downwards in an approximately straight line to the joining point 15, and the exhaust recirculation path 7D for the cylinder #4 extends towards the exhaust recirculation path 7A for the cylinder #1 in an approximately straight line. The paths 7A and 7D are joined to each other at the joining point 15. The exhaust recirculation path 7D is curved so as to pass through a space above a nut or bolt which is a tightening point 25 of the attachment flange 22 so that the exhaust recirculation path 7D does not cover the nut or bolt or the tightening point 25. Similarly, the exhaust recirculation path 7A is slightly bent in a crank shape so as not to cover a tightening point 26 of the attachment flange 22. The exhaust recirculation path 7B for the cylinder #2 and the exhaust recirculation path 7C for the cylinder #3 extend straight in the direction orthogonal to the exhaust recirculation path 7A from the respective branching points 6 that branch from the respective main exhaust paths 3 so as to be perpendicularly connected to the exhaust recirculation path 7A. The downstream exhaust recirculation path 7' is approximately straight connected to the end of the exhaust recirculation path 7A for the cylinder #1.

As described above, by making the total path length of the exhaust recirculation paths 7 from the respective exhaust ports 2 for the cylinders to a point immediately before the bypass catalytic converter 8 as short as possible, the thermal capacity thereof is reduced and therefore, the bypass catalytic converter 8 is immediately activated after a cold start and the exhaust purification starts at an early stage.

In addition, the exhaust recirculation path 7 also serves as a portion of the bypass 12 that guides the exhaust gas to the bypass catalytic converter 8, so as to contribute to the simple structure and the reduction in the number of parts.

In the above-mentioned embodiments, although the bypass 12 having the bypass catalytic converter 8 is structured so as to rejoin to the main flow path, the present exhaust system is not limited thereto. For example, it is acceptable to have a structure such that the exhaust gas is released to the outside while the bypass 12 remains separated from the main path. In addition, the present exhaust system is not limited to a serial four-cylinder engine, and it can be applied to a variety of serial multiple cylinder internal combustion engines or V-type internal combustion engines, etc.

As described above as embodiments, the present exhaust system for an internal combustion engine has the exhaust recirculation paths 7 that are branched from the main exhaust paths 3 so that part of the exhaust gas is recirculated from the main exhaust paths 3 to the inlet system that is connected to either a single or multiple cylinders. The downstream exhaust reflex path 7' has the exhaust recirculation control valve 14, so that the exhaust gas is lead to the exhaust recirculation path 7' having the exhaust recirculation control valve 14 which is located downstream of the exhaust system. The exhaust system has further the bypass 12 having a cross-section path area smaller than that of the exhaust recirculation path 7 and the bypass catalytic converter 8 is provided in the bypass 12.

In such a system, in the operational period during which the exhaust recirculation is required, the exhaust recirculation control valve 14 opens and part of the exhaust gas is supplied to the inlet system via the downstream exhaust recirculation path 7'. Therefore, the exhaust gas does not flow into the bypass catalytic converter 8 thereby preventing the thermal deterioration or pollution. In addition, an exhaust recirculation may be carried out in order to reduce a pumping loss when fuel is reduced along with speed reduction.

Thus, the flow path switching valve 5 that closes the main exhaust paths 3 on the downstream side of the branching point 6 can be used as a flow path switching mechanism or means for discharging the exhaust gas via the bypass catalytic converter 8 of the bypass 12. When the flow path switching valve 5 is closed, all the exhaust gas goes into the exhaust recirculation path 7, and flows to the bypass 12, but if the exhaust recirculation control valve 14 is open, part of the exhaust gas is introduced to the inlet system. When the flow path switching valve 5 is open, due to the path resistance, the exhaust gas mainly flows through the main exhaust paths 3 and hardly flows through the bypass 12. In particular, if the exhaust recirculation control valve 14 is open at that time, the exhaust gas that flows into the exhaust recirculation paths 3 go towards the inlet system and does not pass through the bypass catalytic converter 8.

The exhaust recirculation paths 7 branch out from the respective main exhaust paths 3 that are connected to the respective cylinders, and at the same time, these multiple exhaust recirculation paths 7 eventually join to the single flow path, and the above-mentioned bypass 12 branches from the portion where the main exhaust paths 3 join to the single flow path (see FIGS. 3 and 4).

Accordingly, a sufficient amount of recirculation exhaust gas can be supplied to the inlet system from all of the cylinders.

More specifically, for example, the exhaust recirculation path 7 for the primary cylinder that is located on one end of the internal combustion engine stretches approximately straight towards the other end of the internal combustion engine from the branching point 6 where the exhaust recirculation path 7 branches from the main exhaust path 3 of the cylinder, and the exhaust recirculation paths 7 for the remaining cylinders are extended from points that are different from each other so as to be connected at an appropriate angles. The downstream exhaust recirculation path 7' that is a single flow path is approximately straight connected to the exhaust recirculation path 7 of the primary cylinder.

With the above-mentioned structure, the exhaust recirculation paths 7 for the cylinders can be joined so that the entire path length becomes relatively short, whereby thermal capacity thereof becomes small so that there is advantage that the temperature of the bypass catalytic converter 8 is increased fast. In addition, the bypass 12 or the bypass catalytic converter 8 is arranged on one side in the longitudinal direction of the internal combustion engine, allowing for example, an easy layout with the main exhaust path that is structured as an exhaust manifold. In addition, exhaust gas from the cylinders smoothly flows into the exhaust recirculation paths 7 on the downstream side thereof.

Although the bypass 12 can have a structure in which one end thereof is open to the atmosphere, separately from the main exhaust paths 3, preferably, it joins to the main flow path downstream of the main exhaust paths 3 on the relative downstream side of the bypass catalytic converter 8. In general, the main catalytic converter 4 is arranged on the downstream side of the main exhaust paths 3 and therefore, the exhaust gas that goes through the bypass 12 additionally goes through this main catalytic converter 4.

When the exhaust gas passes through the main exhaust paths 3, even if the bypass 12 is not particularly closed, the amount of the exhaust gas that passes through the bypass catalytic converter 8 is reduced and therefore thermal deterioration or pollution of the catalyst does not occur easily. In addition, there is no need to close the bypass 12 as part of the flow path switching means, and therefore its structure can be simplified since the valve 5 opens/closes only the main exhaust path side.

The preceding description has been presented only to illustrate and describe exemplary embodiments of the exhaust system of an internal combustion engine of the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. An exhaust system for an internal combustion engine comprising:
    at least one main exhaust path connected to at least one cylinder;
    an exhaust recirculation path branching out from the main exhaust path so that part of exhaust gas is recirculated to an inlet system;
    a bypass branching out from the exhaust recirculation path and rejoining the main exhaust path to release the exhaust gas to outside, the bypass having a higher path resistance than that of the exhaust recirculation path; and
    a bypass catalytic converter provided in the bypass.

2. The exhaust system for an internal combustion engine according to claim 1, wherein
    the bypass catalytic converter contributes to the higher path resistance.

3. The exhaust system for an internal combustion engine according to claim 1, wherein
    the bypass has a cross sectional path area smaller than that of the exhaust recirculation path and contributes to the higher path resistance.

4. The exhaust system for an internal combustion engine according to claim 1, further comprising
    a flow path switching valve that selectively closes the main exhaust path so that the exhaust gas flows from the main exhaust path to the bypass.

5. The exhaust system for an internal combustion engine according to claim 1, wherein
    the bypass has a cross sectional path area smaller than that of the exhaust recirculation path, and
    both cross-sectional area of the bypass and the catalytic converter contribute to the higher path resistance.

6. An exhaust system for an internal combustion engine comprising:
    two or more main exhaust paths connected to respective two or more cylinders;
    an exhaust recirculation path for recirculating part of exhaust gas to an inlet system, the exhaust recirculation path has two or more separate exhaust recirculation paths being connected to the respective two or more main exhaust paths and a merged exhaust recirculation path into which the two or more separate recirculation paths are merged, the merged exhaust recirculation path is connected to the inlet system;
    a bypass branching out from the exhaust recirculation path and rejoining the main exhaust path to release the exhaust gas to outside, the bypass having a cross sectional path area that is smaller than that of the exhaust recirculation path; and
    a bypass catalytic converter provided in the bypass.

7. The exhaust system for an internal combustion engine according to claim 6, further comprising
    a flow path switching valve that selectively closes the two or more main exhaust paths, the flow path switching valve being provided downstream of respective branching points so that the exhaust gas flows from the main exhaust paths to the bypass.

8. The exhaust system for an internal combustion engine according to claim 6, further comprising
    the bypass branches out from the merged exhaust recirculation path.

9. The exhaust system for an internal combustion engine according to claim 8, wherein
    a branching point, at which the bypass branches out from the merged exhaust recirculation path, is adjacent to a merging point at which the separate exhaust recirculation paths merge into a single flow path.

10. The exhaust system for an internal combustion engine according to claim 9, wherein the merging point is the branching point.

11. The exhaust system for an internal combustion engine according to claim 8, wherein
    the two or more cylinders include a first cylinder that is located on one end in an axial direction of a crankshaft of an internal combustion engine, the two or more main exhaust paths including a first main exhaust path that is connected to the first cylinder, and the two or more separate exhaust recirculation paths including a first separate exhaust recirculation path that branches out from the first main exhaust path;
    the first separate exhaust recirculation path extending approximately straight towards the other end in the axial direction of the crankshaft of the internal combustion engine from a first branching point at which the first separate exhaust recirculation path branches out from the first main exhaust path;
    the remaining ones of the two or more separate exhaust recirculation paths are connected to the first main exhaust path at points of the first main exhaust path that are different from each other at approximately right angles; and
    the merged exhaust recirculation path is connected approximately straight to the first exhaust recirculation path for the first cylinder.

12. The exhaust system for an internal combustion engine according to claim 6, wherein the bypass rejoins a main flow path, into which the main exhaust paths merge, on a downstream side relative to the bypass catalytic converter.

13. The exhaust system for an internal combustion engine according to claim 12, further comprising
    a main catalytic converter disposed in the main flow path, a joining point at which the bypass rejoins the main flow path being positioned on an upstream side of the main catalytic converter.

14. An exhaust system for an internal combustion engine, comprising:
- a first means for introducing exhaust gas into a main exhaust path that is connected to a cylinder of an internal combustion engine at an upstream end thereof and that has a main catalytic converter therein;
- a second means for introducing the exhaust gas into an exhaust recirculation path that branches out from the main exhaust path at a branching point that is located upstream of the main catalytic converter and that has a cross sectional path area smaller than that of the main exhaust path,
- a third means for introducing the exhaust gas to a bypass, that branches out from the exhaust recirculation path at the bypass branching point, that has a cross-sectional path area smaller than that of the exhaust recirculation path, and that has a bypass catalytic converter therein, wherein the bypass joins the main exhaust path at a bypass joining point between the branching point of the exhaust recirculation path and the main catalytic converter;
- a fourth means for blocking the main exhaust path between the branching point of the exhaust recirculation path and the bypass joining point;
- a fifth means for blocking the exhaust recirculation path that is downstream of the bypass branching point; and
- a sixth means for releasing the blocking of the main exhaust path between the branching point and the bypass joining point after the engine is warmed up.

15. A method for purifying exhaust gas, comprising the following steps of:
- introducing the exhaust gas into a main exhaust path that is connected to the cylinder of an internal combustion engine at an upstream end thereof and that has a main catalytic converter therein;
- introducing the exhaust gas into an exhaust recirculation path that branches out from the main exhaust path at a branching point that is located upstream of the main catalytic converter and that has a cross sectional path area smaller than that of the main exhaust path;
- introducing the exhaust gas to a bypass, that branches out from the exhaust recirculation path at the bypass branching point, that has a cross-sectional path area smaller than that of the exhaust recirculation path, and that has a bypass catalytic converter therein, wherein the bypass joins the main exhaust path at a bypass joining point between the branching point 6 of the exhaust recirculation path and the main catalytic converter;
- blocking the main exhaust path between the branching point of the exhaust recirculation path and the bypass joining point;
- blocking the exhaust recirculation path that is downstream of the bypass branching point; and
- releasing the blocking of the main exhaust path between branching point and the bypass joining point after the engine is warmed up.

* * * * *